United States Patent [19]

Subirana

[11] 3,876,651
[45] Apr. 8, 1975

[54] PYRIDINE SALT OF 2,5-DIHYDROXY BENZENE SULFONATE P-CHLOROPHENOXY ISOBUTYRIC ESTER AND A METHOD FOR THE PREPARATION THEREOF

[75] Inventor: Antonio Esteve Subirana, Barcelona, Spain

[73] Assignee: Laboratorios del Dr. Esteve, S.A., Geneva, Switzerland

[22] Filed: May 14, 1973

[21] Appl. No.: 360,394

[30] Foreign Application Priority Data

May 17, 1972 Switzerland.......................... 7327/72

[52] U.S. Cl..................... 260/294.8 R; 260/501.17; 260/501.21; 260/512 R; 424/263; 424/316
[51] Int. Cl............................................. C07d 31/48
[58] Field of Search .............................. 260/294.8 R

[56] References Cited
UNITED STATES PATENTS
3,718,655    2/1973    Ferrer-Saiat et al. ......... 260/294.8 R Primary Examiner—Alan L. Rotman
Attorney, Agent, or Firm—Hume, Clement, Brinks, Willian, Olds & Cook

[57] ABSTRACT

Mono- and diesters of 2,5-dihydroxy benzene sulfonic acid are represented by one of the following formulae:

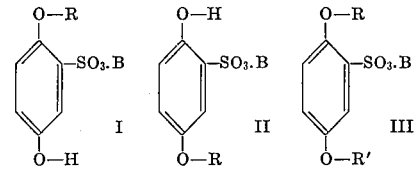

wherein R and R' can be identical or different and represent an alkanyl, arylalkanoyl, aryloxyalkanoyl, aryl, alkanesulfonyl, arenesulfonyl, alkylarenesulfonyl or arylalkanesunonyl radical, B represents the cation of an alkali metal, alkaline-earth metal, of ammonia or an unsubstituted or substituted, open chain or cyclic amine, and are remarkable for their hypocholesterolemic, hypotriglycidemic and hypolipidemic activity.

2 Claims, No Drawings

THE PYRIDINE SALT OF 2,5-DIHYDROXY BENZENE SULFONATE P-CHLOROPHENOXY ISOBUTYRIC ESTER AND A METHOD FOR THE PREPARATION THEREOF

This invention concerns novel 2,5-dihydroxy benzene sulfonic acid mono- and diesters, and a process for preparing them.

These compounds have one of the following formulae:

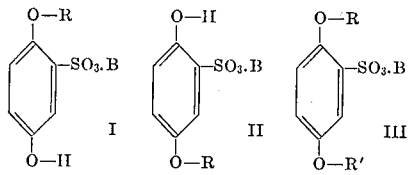

wherein R and R' can be identical or different, and represent an alkanoyl, arylalkanoyl, aryloxyalkanoyl, aroyl, alkanesulfonyl, arenesulfonyl, alkylarensulfonyl or arylalkanesulfonyl radical. On the other hand, B is an alkali metal, an alkalineearth metal, ammonia or unsubstituted or substituted amine cation, for instance alkanoylamines, alkyl- and aryl-amines, cyclic amines etc.

Compounds having the general formulae I, II and III possess extremely interesting pharmacodynamical properties. Particularly, they show a potent hypercholesterolemic, hypotriglycidemic, and hypolipidemic effect.

According to the invention, the process for preparing compounds having general formulae I, II and III is characterized in that a compound of formula:

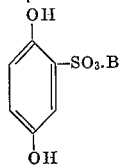

wherein B has the above-defined meaning, is reacted with a halide or an anhydride of the acid of formula R—H, and optionally with an acid of formula R'—H wherein R has the above-defined meaning.

The operation is effected preferably in an aprotic medium, generally a proton acceptor base such as pyridine, picoline, trimethylamine etc., to which may be added an organic solvent inert under the reaction conditions, for instance benzene, toluene, chloroform, diethyl ether, dimethylformamide, etc. Desirably the reaction is effected at a temperature between 20° and −10°C, preferably between 5° and −10°C. It is also possible to effect the reaction at a higher temperature, but then external cooling must be provided, since the reaction is exothermic.

While studying the reaction, one has observed that it can be performed starting from the sulfonic acid in free or salt form, although the yield of the operation is clearly higher when starting from the salt, than when starting from the free acid. It was also noted that the operation develops much better if, in addition to using a salt of the sulfonic acid, pyridine is used as the only solvent; in this way the pyridine salt of the desired compound is obtained with optimum yield. Starting from this pyridine salt, the other desired salts may be obtained by simple displacement.

All the thus obtained compounds can be separated from the reaction mixture in the usual manner, generally by simple filtration, optionally after preliminary decolorizing with charcoal, in the warm solution, and filtering while warm. They are then purified, e.g., by recrystallization.

The following examples illustrate the invention.

EXAMPLE 1

A solution of 29 gr of diethylamine 2,5-dihydroxy benzene sulfonate in 100 ml of pyridine is placed in an erlenmeyer provided with stirring means and a cooling bath, and 10 gr of succinic anhydride are gradually added thereto. Stirring is continued for two hours at room temperature, and the reaction is set aside for 14 hours in a chamber at 60°C. The reaction mixture is poured on to a mixture of ice and concentrated hydrochloric acid, and it is extracted with chloroform. After evaporating the chloroform from the extract, a solid is obtained which is recrystallized in ethanol. Yield: 9.0 gr; melting point: 82°C. It is the monosuccinate of pyridine-2,5-dihydroxy-benzene-sulfonate.

EXAMPLE 2

To a solution of 1 gr of sodium 2,5-dihydroxy benzene sulfonate in 15 ml of pyridine, placed in an erlenmayer provided with stirring means and a cooling bath, 1.2 gr of p-chlorophenoxy isobutyryl chloride are added, stirring is continued for one hour, and it is left in a chamber at 60°C overnight. The reaction mixture is poured on to a mixture of ice and hydrochloric acid, and extracted with chloroform. Finally, 1,2 gr of mono-p-chloro phenoxy isobutyrate of pyridine 2,5-dihydroxy benzene sulfonate, melting point: 114°C, are obtained.

EXAMPLE 3

Into a flask provided with stirring means and a cooling bath, a solution of 26 gr of diethylamine, 2,5-dihydroxy benzene sulfonate in 150 ml of pyridine, is placed, and 30 gr of benzoyl chloride are added gradually. Stirring is continued for 5 hours, and the mixture is poured on to a mixture of ice and concentrated hydrochloric acid. It is left in a refrigerator for 12 hours, and the precipitate obtained is collected on a filter, and recrystallized in methanol. Yield 35 gr; melting point: 235°C. It is the dibenzoate of pyridine 2,5-dihydroxy benzene sulfonate.

EXAMPLE 4

Into a flask provided with stirring and refrigerating means, a solution of 53 gr of diethylamine 2,5-dihydroxy benzene sulfonate in 300 ml of pyridine are placed, and 28 gr of benzoyl chloride are added gradually. Stirring is continued overnight, and the reaction mixture is poured on to a mixture of ice and concentrated hydrochloric acid. 35 gr of the monobenzoate of pyridine 2,5-dihydroxy benzene sulfonate, melting point: 140°C, are obtained.

EXAMPLE 5

A solution of 23 gr of diethylamine 2,5-dihydroxy benzene sulfonate in 150 ml of pyridine are placed in a flask provided with stirring and refrigerating means, and a suspension of 25 gr of nicotinoyl chloride hydrochloride in 50 ml of benzene are slowly added, stirring being continued for 8 hours. The reaction mixture is poured into a mixture of ice and concentrated hydrochloric acid, and 25 gr of pyridine 2,5- dihydroxybenzene sulfonate mono nicotinate, having a melting point of 270°C, are obtained.

EXAMPLE 6

A solution of 29 gr of diethylamine 2,5-dihydroxy benzene sulfonate in 150 ml of pyridine are placed in a flask provided with stirring and refrigerating means, and 28 ml of benzene sulfonyl chloride are gradually added. Stirring is continued for 14 hours, and the reaction mixture is poured on to a mixture of ice and concentrated hydrochloric acid. After recrystallization in ethanol, 36 gr of a solid having a melting point of 195°C are obtained, which is pyridine 2,5-dihydroxy benzene sulfonate dibenzene sulfonate.

EXAMPLE 7

A solution of 27 gr of diethylamine 2,5-dihydroxy benzene sulfonate in 150 ml of pyridine are placed in a flask provided with stirring and refrigerating means, and 19 ml of benzene sulfonyl chloride are slowly added. Stirring is continued for 24 hours, and the reaction mixture is poured on to a mixture of ice and concentrated hydrochloric acid. It is extracted with chloroform, and finally 13 gr of pyridine 2,5-dihydroxy benzene sulfonate mono-benzene sulfonate, melting at 75°C, are obtained.

EXAMPLE 8

A solution of 20 gr of diethylamine 2,5-dihydroxy benzene sulfonate in 75 ml of pyridine are placed in a flask provided with stirring and refrigerating means, and 28.5 gr of tosyl chloride are slowly added. Stirring is continued for four hours, and the reaction mixture is poured on to a mixture of ice and concentrated hydrochloric acid. It is filtered and the precipitate obtained is recrystallized in ethanol or water. 40 gr of pyridine 2,5-dihydroxy benzene sulfonate ditosylate, having a melting point of 198°C, are obtained.

EXAMPLE 9

A solution of 100 gr of diethylamine 2,5-dihydroxy benzene sulfonate in 275 ml of pyridine are placed in a flask provided with stirring and refrigerating means, and 72 gr of tosyl chloride are gradually added during one hour. Stirring is continued for eight hours, and the reaction mixture is poured on to a mixture of ice and concentrated hydrochloric acid. 83.2 gr of pyridine 2,5-dihydroxy benzene sulfonate mono-tosylate, having a melting point of 139°C are obtained.

EXAMPLE 10

To a solution of 42.3 gr of pyridine 2,5-dihydroxy benzene sulfonate mono-tosylate in 75 ml of absolute ethanol, 4.0 gr of sodium hydroxide dissolved in 15 ml of water are added. A precipitate is formed which is collected on a filter. 34.7 gr of sodium 2,5-dihydroxy benzene sulfonate mono-tosylate are obtained. The infrared spectrum recorded in a KBr pellet gives maxima at the following frequencies: 1,415, 1,365, 1,200, 1,090, 1,030 and 835 cm$^{-1}$.

EXAMPLE 11

To a solution of 42.5 gr of pyridine 2,5-dihdroxy benzene sulfonate mono-tosylate in 75 ml of ethanol, 7.3 gr of diethylamine dissolved in 15 ml of ethanol are added. A precipitate is formed which is collected on a filter. 21 gr of diethylamine 2,5-dihydroxy benzene sulfonate mono-tosylate, having a melting point of 132°C, are obtained.

The compounds according to the invention significantly inhibit the increase of plasma levels of cholesterol, triglycerides and total lipids in albino rats treated with Triton WR-1339 (Friedmann M. and Byers S. O., J. Exptl. Med., 1953, 97, 117; Garattini S., Morpurgo C., Paoletti P. and Paoletti R., Arzneimittelforsch., 1959, 9, 206; Garattini S., Paoletti R., Bizzi L., Grossi E. and Veruta R., "Drugs affecting Lipid Metabolism," Elsevier, 1961, pp. 144–157. Similarly, they inhibit significantly the increase of plasma levels of cholesterol and total lipids in white Leghorn chickens (Tennent D.M., Siegel H., Kuron G.W., Ott W. H. and Mushett C. W. Proc. Soc. Exptl. Biol. Med., 1957, 96, 679).

Cholesterol was determined according to the Liebermann and Burchard method, as modified by Richterich (Richterich R. and Lauber K., Klin. Wschr., 1962, 40, 1952), the total lipids according to the method of Zollner and Kirsh (Zollner H. and Kirsh K., Z. ges. exp. Med., 1962, 135, 545) and triglycerides were determined by densitometry, after extracting the plasma according to the method of Folch (Folch, J. Biol. Chem., 1957, 226, 497) and thin layer chromatography separation.

Because of the low toxicity of these compounds, and hence their high therapeutical index, their clinical performance is shown to be extremely interesting for the treatment of various types of hyperlipemia and dislipemia.

The pharmacodynamical properties of the compounds according to the invention are illustrated hereinbelow by those of sodium 2,5-dihydroxy benzene sulfonate mono-tosylate, prepared in Example 10 above.

1. Acute toxicity in the mouse and rat
18 to 25 gr albino mouse.
100 to 150 gr Sprague-Dawley rats.
The LD$_{50}$ was determined according to the method of Reed and Muench.

Table I

| administration | species | LD$_{50}$ (mg/kg) | fiducial limits |
|---|---|---|---|
| | | | (for p = 0.95) |
| oral | mouse male | 5.600 | (6.056 – 4.820) |
| oral | mouse female | 3.623 | (4.355 – 3.013) |
| oral | rat male | 6.002 | (7.554 – 4.766) |
| oral | rat female | 5.563 | (7.003 – 4.418) |

2. Hypolipemic action on the rat

The above-mentioned Triton WR-1339 method was selected. The total cholesterol, free cholesterol triglycerids and total lipids were determined in the serum. The results obtained are given in Table II. The amount of Triton WR-1339 administered to the animals was 300 mg/kg. The amount of sodium 2,5-dihydroxy benzene sulfonate mono-tosylate administered was 2 mmoles/kg orally. The letter P signifies probability.

Table II

|  | Triton | Triton + sodium 2,5-dihydroxybenzene sulfonate monotosylate |
|---|---|---|
| total cholesterol mg % ml of plasma | 283.3 ± 18.9 | 254.2 ± 21.6 |
| Δ% with respect to Triton | | − 10 % |
| P | | 0.15<P<0.20 |
| free cholesterol mg % ml of plasma | 102.2 ± 8.5 | 59.8 ± 3.1 |
| Δ% with respect to Triton | | − 42 % |
| P | | P<0.0005 |
| triglycerides mg % Δ ml of plasma | 1122.5 ± 72.7 | 713.3 ± 59.6 |
| Δ% with respect to Triton | | − 36 % |
| P | | P<0.0005 |
| total lipids mg % ml of plasma | 2088.6 ± 220.6 | 1289.2 ± 111.6 |
| Δ% with respect to Triton | | − 39 % |
| P | | 0.0005 P<0.0025 |

3. Hypolipemic action on the chicken

This study was performed with white Leghorn chickens, according to the above-mentioned method. The total cholesterol and the total lipids are determined in the plasma. The results obtained are given in Table III.

Table III

|  | check sample | sodium 2,5-dihydroxy-benzenesulfonate monotosylate |
|---|---|---|
| total cholesterol mg % ml of plasma, value initial (a) | 89.1 ± 1.9 | 93.1 ± 4.0 |
| total cholesterol mg % ml of plasma, initial value (b) | 496.4 ± 36.5 | 409.1 ± 32.9 |
| b/a · 100 | 565 ± 42 (X) | 441 ± 32 (Y) |
| X-Y/X · 100 | | − 22 % |
| P | | 0.01<P<0.0125 |
| total lipids mg % ml of plasma, initial value (a) | 316.3 ± 8.4 | 325.2 ± 11.6 |
| total lipids mg % ml of plasma, final value (b) | 1274.2 ± 68.0 | 1029.4 ± 59.5 |
| b/a · 100 | 411 ± 25 (X) | 322 ± 17 (Y) |
| X-Y/X · 100 | | − 22 % |
| P | | 0.0025<P<0.005 |

The proposed human dose is 1 to 3 gr per day. The preferred pharmaceutical formulations are tablets and capsules, containing 250 or 500 mg of active compound of formula I, II or III per unit dose.

Example of formulation for a tablet

| sodium 2,5-dihydroxybenzenesulfonate monotosylate | 0.500 g |
|---|---|
| rice starch | 0.100 g |
| lactose | 0.100 g |

-Continued

Example of formulation for a tablet

| polyvinylpyrrolidone | 0.020 g |
|---|---|
| magnesium stearate | 0.003 g |
| weight of tablet | 0.723 g |

Example of formulation for a capsule

| sodium 2,5-dihydroxybenzenesulfonate monotosylate | 0.250 g |
|---|---|
| lactose | 0.050 g |
| aerosil | 0.001 g |
| magnesium stearate | 0.002 g |
| weight of capsule | 0.303 |

I claim:

1. The pyridine salt of 2,5-dihydroxybenzenesulfonate p-chlorophenoxyisobutyric ester having the following formula:

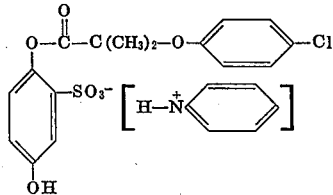

2. A method for manufacturing the salt defined in claim 1, comprising the steps of reacting the pyridine salt of 2,5-dihydroxybenzene-sulfonate with a halide or the anhydride of p-chlorophenoxyisobutyric acid.

* * * * *